United States Patent
Huschke et al.

(10) Patent No.: US 10,367,760 B2
(45) Date of Patent: *Jul. 30, 2019

(54) MULTICAST CHANNEL CONTROL INFORMATION

(71) Applicant: IDTP HOLDINGS, INC., Wilmington, DE (US)

(72) Inventors: Jörg Huschke, Aachen (DE); Ghyslain Pelletier, Montreal (CA); Mai-Anh Phan, Herzogenrath (DE)

(73) Assignee: IDTP Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/907,723

(22) Filed: Feb. 28, 2018

(65) Prior Publication Data

US 2018/0191639 A1 Jul. 5, 2018

Related U.S. Application Data

(63) Continuation of application No. 15/095,715, filed on Apr. 11, 2016, now Pat. No. 9,942,170, which is a
(Continued)

(51) Int. Cl.
*H04L 12/947* (2013.01)
*H04L 12/18* (2006.01)
(Continued)

(52) U.S. Cl.
CPC .......... *H04L 49/25* (2013.01); *H04H 20/423* (2013.01); *H04J 15/00* (2013.01); *H04L 12/189* (2013.01);
(Continued)

(58) Field of Classification Search
CPC ....... H04L 29/08; H04L 12/18; H04L 12/939; H04L 12/725; H04L 49/25; H04W 72/00; H04H 20/42; H04H 20/423; H04J 99/00
See application file for complete search history.

(56) References Cited

U.S. PATENT DOCUMENTS 7,986,612 B2 7/2011 Duan et al.
2002/0124086 A1 9/2002 Mar
(Continued)

FOREIGN PATENT DOCUMENTS

CN 101268709 A 9/2008
CN 101272518 A 9/2008
(Continued)

OTHER PUBLICATIONS

3rd Generation Partnership Project (3GPP), Tdoc R2-094597, "E-mail Discussion on eMBMS Control Plane Details (66b#11 )", Samsung, 3GPP TSG-RAN2#67 Meeting, Shenzhen, P.R. China, Aug. 24-28, 2009, pp. 1-15.
(Continued)

*Primary Examiner* — Anez C Ebrahim
(74) *Attorney, Agent, or Firm* — Condo Roccia Koptiw LLP

(57) ABSTRACT

The present disclosure relates to a technique for configuring transmission of a multicast channel carrying scheduling information and data belonging to one or more multicast services, the scheduling information indicating scheduling of the multicast services mapped to the multicast channel. A method embodiment comprises the steps of configuring (404) the transmission of the scheduling information on the multicast channel based on a scheduling information specific transmission requirement and configuring (404) the transmission of the data belonging to the one or more multicast services based on a service specific transmission requirement; and signalling (406) the scheduling information specific transmission requirement and the service specific transmission requirement.

12 Claims, 7 Drawing Sheets

Related U.S. Application Data continuation of application No. 13/389,487, filed as application No. PCT/EP2010/003321 on Jun. 1, 2010, now Pat. No. 9,313,770.

(60) Provisional application No. 61/236,648, filed on Aug. 25, 2009.

(51) Int. Cl.

| | | |
|---|---|---|
| *H04W 72/00* | (2009.01) | |
| *H04L 29/08* | (2006.01) | |
| *H04H 20/42* | (2008.01) | |
| *H04J 99/00* | (2009.01) | |
| *H04L 12/725* | (2013.01) | |
| *H04L 12/939* | (2013.01) | |
| *H04W 72/12* | (2009.01) | |
| *H04L 29/06* | (2006.01) | |

(52) U.S. Cl.
 CPC ........ *H04L 12/1881* (2013.01); *H04L 45/302* (2013.01); *H04L 49/555* (2013.01); *H04L 67/322* (2013.01); *H04W 72/005* (2013.01); *H04L 65/4076* (2013.01); *H04L 65/80* (2013.01); *H04W 72/1289* (2013.01)

(56) References Cited

U.S. PATENT DOCUMENTS

| | | |
|---|---|---|
| 2003/0156594 A1 | 8/2003 | Trott et al. |
| 2003/0169722 A1 | 9/2003 | Petrus et al. |
| 2004/0100920 A1 | 5/2004 | Ball et al. |
| 2005/0113105 A1 | 5/2005 | Wigard et al. |
| 2005/0135308 A1 | 6/2005 | Vijayan et al. |
| 2007/0147539 A1 | 6/2007 | Gorokhov et al. |
| 2007/0253367 A1* | 11/2007 | Dang ................. H04W 72/005 370/329 |
| 2009/0061914 A1 | 3/2009 | Cai |
| 2009/0073911 A1* | 3/2009 | Cheon .................. H04L 1/0015 370/312 |
| 2009/0227278 A1 | 9/2009 | Cho et al. |
| 2009/0245155 A1 | 10/2009 | Fukunaga et al. |
| 2009/0316806 A1 | 12/2009 | Cheng et al. |
| 2010/0208678 A1 | 8/2010 | Choi et al. |
| 2012/0163286 A1 | 6/2012 | Huschke et al. |
| 2013/0250840 A1 | 9/2013 | Chen et al. |

FOREIGN PATENT DOCUMENTS

| | | |
|---|---|---|
| CN | 101291452 A | 10/2008 |
| CN | 101296102 A | 10/2008 |
| CN | 101511121 A | 8/2009 |
| EP | 2068492 A1 | 6/2009 |
| JP | 2011-509548 A | 3/2011 |
| JP | 5583216 B2 | 9/2014 |
| WO | WO 2006/037492 A1 | 4/2006 |
| WO | WO 2008/113262 A1 | 9/2008 |
| WO | WO 2009/076210 A1 | 6/2009 |

OTHER PUBLICATIONS

3rd Generation Partnership Project (3GPP), R2-093798, "QoS Mechanisms for MBMS", Ericsson, ST-Ericsson, 3GPP TSG-RAN WG2 #66bis, Los Angeles, USA, Jun. 29- Jul. 3, 2009, 5 pages.

3rd Generation Partnership Project (3GPP), R2-093848, "Message Structure for Rel-9 MBMS", Panasonic, 3GPP TSG RAN WG2#66bis, Los Angeles, USA, Jun. 29-Jul. 3, 2009, 4 pages.

3rd Generation Partnership Project (3GPP), R1-094691, "MCS Set for MCCH to Ensure QoS in Different Cell Sizes and Deployments", Huawei, 3GPP TSG RAN WG1 Meeting #59, Jeju, Korea, Nov. 9-13, 2009, 4 pages.

3$^{rd}$ Generation Partnership Project (3GPP), R2-093894, "MCS configuration method", ZTE, 3GPP TSG RAN WG2, Meeting # 66 bis, Los Angeles, USA, Jun. 29-Jul. 3, 2009, 4 pages.

* cited by examiner

MULTICAST CHANNEL CONTROL INFORMATION

CROSS-REFERENCE TO RELATED APPLICATIONS

This application is a continuation application of U.S. patent application Ser. No. 15/095,715, filed Apr. 11, 2016, which is a continuation application of U.S. patent application Ser. No. 13/389,487, filed Mar. 15, 2012, now U.S. Pat. No. 9,313,770, which is a National Stage entry under 35 U.S.C. § 371 of PCT Application No. PCT/EP2010/003321, filed Jun. 1, 2010. Each of U.S. patent application Ser. Nos. 15/095,715, 13/389,487, now U.S. Pat. No. 9,313,770, and PCT Application No. PCT/EP2010/003321 claims the benefit of U.S. Provisional Patent Application No. 61/236,648, filed Aug. 25, 2009. The contents of each of U.S. patent application Ser. Nos. 15/095,715, 13/389,487, now U.S. Pat. No. 9,313,770, PCT Application No. PCT/EP2010/003321, and U.S. Provisional Patent Application No. 61/236,648 are hereby incorporated by reference herein.

TECHNICAL FIELD

The invention generally relates to the field of multicast/broadcast transmission of content data. More specifically, the invention relates to a technique for configuring transmission of a multicast/broadcast channel carrying scheduling information and data belonging to one or more multicast/broadcast services.

BACKGROUND

Multimedia Broadcast Multicast Service (MBMS) is supposed to deliver a variety of services that can cope with different levels of transport Block Error Rates (BLER) on the application layer. Example services are download services, audio/video streaming, and messaging. Some services, like download services, tolerate relatively high BLER, in the order of 10% or even larger, because of error correction coding on higher communication layers.

For example, some download services require a BLER of 20 to 40%, audio/video streaming usually requires a BLER of 0.1 to 1%, and messaging also requires typically a BLER of 0.1 to 1%, i.e. these BLERs are typically assumed to be acceptable for the respective services. In live-critical applications, e.g. emergency or accident warnings, the BLER of messaging services has to be very low, possibly well below 0.1 In the context of MBMS, one known approach is to map services tolerating different transport BLERs to different Multicast Channels (MCHs). That is, service specific BLER requirements can be supported by configuring multiple MCHs with different Modulation and Coding Schemes (MCSs) per MBMS Single Frequency Network (MBSFN) area and mapping each service to the appropriate MCH, i.e. multiple MCHs in an MBSFN area are configured with different MCSs.

In accordance with this commonly known approach, different services tolerating different BLERs are mapped to different MCHs. Each MCH can then be configured for the desired BLER or equivalently a required Quality of Service (QoS) by selecting an appropriate MCS.

When multiple MCHs are used within an MBSFN area, MBMS services can be transmitted differently. Different QoS (or MCS) for different logical channels can be provided by using multiple MCHs and the QoS (or MCS) for all logical channels on one MCH can be same. In other words, the same type of MBMS services can be multiplexed into the same MCH while other types of services can be multiplexed into their own MCHs, e.g. MCH1 for video service type, MCH2 for audio service type, etc.

Due to coding techniques, e.g. motion compensation, broadcasting of static video contents where object and background barely moves (e.g. news or music channel with still images) usually has relatively very low data rates. On the other hand, broadcasting of dynamic video contents, such as sports broadcasting, action movie, music videos without still images, usually has very high data rates. This difference of data size between videos may lead to the condition in which no data for a certain MBMS service will be transmitted for some scheduling periods.

When, for example, a sports channel and a news channel are transmitted simultaneously within an MBSFN area, as the news channel may have a considerably lower bit rate compared to the sports channel, the transmission of the news channel for a certain duration can be done with less scheduling periods.

It is therefore desirable that each MCH carries (dynamic) MCH scheduling information (MSI) for the services mapped to that MCH. Thus, a User Equipment (UE) only wakes up when the service(s) of its interest is (are) transmitted, while it can sleep during the transmission of other services or when no service is transmitted. It has been discussed in 3GPP standardization to transmit the MSI in the first Transport Block (TB) of a scheduling interval. The radio resource, e.g. a subframe in the context of Long Term Evolution (LTE), in which the MSI is transmitted, is therefore known implicitly from the start of the scheduling interval. A scheduling interval is typically 320 ms, but it may also be shorter or up to a few seconds in duration depending on the services' burstiness and on the limit of the delay that is introduced by the scheduling.

For example, the MSI indicates future scheduling of the MBMS services mapped to the respective MCH and indicates where no data for certain MBMS services will be transmitted for some scheduling periods. For this purpose, the MSI may contain information indicating by a number of scheduling period (like a counter), e.g. how many scheduling periods the UE has to wait for receiving certain MBMS services. Coding MSI of all MBMS services together and mapping the MSI for all MBMS services on the first TB increases efficiency. Further, the UE exactly knows where to wake up in the next scheduling interval(s). The UE only has to wake up extra for the subframe containing the scheduling block, even if it is not interested in the services carried in the first TB.

The MCH is configured according to the QoS requirement of the services it carries. The TB(s) containing the MSI, however, need to have a low BLER, because a UE that cannot decode the MSI at least faces the following problems. The UE that can not decode the MSI either: can not receive any TBs of the intended service in the considered scheduling interval, which reduces the QoS; or the UE has to read all TBs from the start of the scheduling interval up to the start of the TB segment of the intended service to be able to detect its start, which increases battery consumption in the UE.

SUMMARY

Accordingly, there is a need to provide an improved and more efficient configuring technique for broadcast/multicast service transmission.

According to a first aspect, a method for configuring transmission of a multicast channel carrying scheduling information and data belonging to one or more multicast services is provided. The scheduling information indicates scheduling of the multicast services mapped to the multicast channel. The method comprises the steps of configuring the transmission of the scheduling information on the multicast channel based on a scheduling information specific transmission requirement and configuring the transmission of the data belonging to the one or more multicast services based on a service specific transmission requirement; and signaling the scheduling information specific transmission requirement and the service specific transmission requirement.

The multicast service may not only be a multicast service, but may also be a broadcast service or a combined broadcast/multicast service, like a Multimedia Broadcast Multicast Service (MBMS). In case the multicast service conforms to a MBMS specification, the multicast channel may be a Multicast Channel (MCH) and the scheduling information may be MCH Scheduling Information (MSI). Another terminology used for the MSI is Dynamic Scheduling Information (DSI). The scheduling information specific transmission requirement and the service specific transmission requirement may be different from each other and may be signaled from a network node, e.g. an eNodeB (eNB) or a Multi-cell/Multicast Coordination Entity (MCE), to a (mobile) terminal device, e.g. an MBMS-capable User Equipment (UE) or an MBMS-capable LTE UE.

Considering that the MSI for an MCH in LTE MBMS is transmitted in specific subframe(s) of the MCH Subframe Allocation for this MCH while the remainder of the subframes for this MCH are used for the transmission of data belonging to one or more MBMS service(s), and considering that the transmission requirement (e.g., Quality of Service (QoS) requirement) for the MSI may differ significantly from that of the MBMS service(s), it is proposed to use a different transmission requirement or QoS (e.g. Modulation and Coding Scheme (MCS)) for the subframe(s) used for the transmission of the MSI than for the remaining subframes of the MCH. The transmission requirement (e.g., QoS requirement) for the MSI may be set such that a low BIER, as desired for the MSI, is achieved.

In the context of "different transmission requirement or QoS (e.g. MCS) for the subframe(s) used for the transmission of the MSI than for the remaining subframes of the MCH", the term "different" does not necessarily require the transmission requirement or the QoS for the MSI and the data belonging to the one or more MBMS services to be different in value, although the transmission requirement or QoS for the MSI and the data may be different in value. However, the QoS for the MSI and the data may also have the same value or requirements. The term "different" has to be understood in the sense of "separate" or "independent", rather than "different in value". The term "separate" does not require the MSI specific transmission requirement and the service specific transmission requirement to be signaled separately in the sense of "In separate (different) signals", although they may be signaled in different signals. The MSI specific transmission requirement and the service specific transmission requirement may be signaled on the same channel, e.g. on a Broadcast Control Channel (BCCH) or a Multicast Control Channel (MCCH).

The term "different" and thus the term "separate" only requires in the above context that a separate transmission requirement is used for the scheduling information, e.g. MSI, than for the data belonging to the one or more multicast services, e.g. MBMS services, i.e. a scheduling information specific transmission requirement is used for configuring the transmission of the scheduling information and a service specific transmission requirement is used for configuring the transmission of the data belonging to the one or more multicast services.

The above method may further comprise the step of determining a scheduling information specific QoS value related to one or more scheduling information specific QoS properties and determining a service specific QoS value related to one or more service specific QoS properties. For example, the scheduling information specific QoS value comprises a scheduling information specific BIER and the service specific QoS value comprises a service specific BLER. The scheduling information specific BLER may be different from or equal to the service specific BLER. Dependent on the scheduling information specific QoS value and the service specific QoS value, the scheduling information specific transmission requirement and the service specific transmission requirement may be respectively determined or selected.

If the scheduling information specific QoS value differs from the service specific QoS value, the scheduling information specific transmission requirement may be selected based on the scheduling information specific QoS value, i.e. the service specific transmission requirement may be selected separately based on the service specific QoS value. In this way, a different (in the sense of different in value) transmission requirement can be used for the scheduling information than for the data belonging to the one or more multicast services. For example, a transmission requirement having a lower BLER can be used for the scheduling information than for the data belonging to the one or more multicast services. This ensures that the scheduling/ information can be decoded correctly by a mobile terminal receiving the scheduling information.

In the case the scheduling information specific QoS value is equal to the service specific QoS value, a common transmission requirement may be selected for the scheduling information specific transmission requirement and the service specific transmission requirement.

According to a first variant, in case the multicast service conforms to a MBMS specification, the data of each MBMS service may be carried on a respective MBMS Traffic Channel (MTCH) and the one or more MTCHs may be multiplexed into the MCH. If one or more MTCHs are multiplexed with the MSI on one Transport Block (TB), the MCI contains two subsets of data, namely a first subset of data which is multiplexed with the MSI on one TB and a second subset of remaining data which is not multiplexed with the MSI on the TB.

In accordance with this first variant, a single transmission requirement may be selected as the MSI specific transmission requirement and the service specific transmission requirement for both the MSI and the one or more MTCHs multiplexed with the MSI on the TB, i.e. for the MSI and the first subset of data. The service specific transmission requirement may then be selected for the remaining MTCH(s) not multiplexed with the MSI on the TB, i.e. for the second subset of data. According to this variant, separate transmission requirements are selected for the MTCH(s) multiplexed with the MSI on the TB and for the remaining MTCH(s) multiplexed into the MCH. The separate transmission requirements (one for the MSI and the first subset of data and the other for the second subset of data) may be different from or equal to each other.

The single transmission requirement may either be the MSI specific transmission requirement (first realization) or the more robust transmission requirement of the MSI specific transmission requirement and the service specific transmission requirement of the one or more MTCHs multiplexed with the MSI on the TB (second realization).

If the multicast service conforms to a MBMS specification, the MCCH may further be multiplexed with the one or more MTCHs into the MCH.

In accordance with a second variant, which may/may not be combined with the first variant, the method may performed for a plurality of multicast channels, e.g. MCHs. In this case, a different service specific transmission requirement may be used for each of the plurality of multicast channels and the same scheduling information specific transmission requirement may be used for each or for at least two or more of the plurality of multicast channels.

According to a second aspect, a method for decoding a multicast channel carrying a scheduling information and data belonging to one or more multicast services is proposed. The scheduling information indicates scheduling of the multicast services mapped to the multicast channel. The method comprises the steps of determining a scheduling information specific transmission requirement and a service specific transmission requirement; and decoding the scheduling information based on the scheduling information specific transmission requirement and decoding the data belonging to the one or more multicast services based on the service specific transmission requirement. In this way, a separate transmission requirement is achieved for the scheduling information and the data belonging to the one or more multicast services.

The scheduling information specific transmission requirement may be determined by a (mobile) terminal device, e.g. a User Equipment (UE), from a signal received by the terminal device from a network node, e.g. an eNodeB (eNB).

According to a first variant of the second aspect, the multicast channel may be a Multicast Channel (MCH), the scheduling information may be MCH scheduling information (MSI), and the multicast service may conform to a Multimedia Broadcast Multicast Service (MBMS) specification. The MSI specific transmission requirement and the service specific transmission requirement may be determined (by a terminal device) from a Broadcast Control Channel (BCCH) or a Multicast Control Channel (MCCH) which may be signaled from a network node to the terminal device.

The separate scheduling information specific transmission requirement and the service specific transmission requirement may be different from or equal to each other.

If the scheduling information specific transmission requirement differs from the service specific transmission requirement, the scheduling information (received by the terminal device from the network node) may be decoded based on the scheduling information specific transmission requirement and the data belonging to the one or more multicast services (received by the terminal device from the network node) may be decoded based on the service specific transmission requirement.

If the scheduling information specific transmission requirement is equal to the service specific transmission requirement, the scheduling information and the data belonging to the one or more multicast services may be decoded based on a common transmission requirement. The common transmission requirement may be the scheduling information specific transmission requirement or the service specific transmission requirement or may be the more robust of the scheduling information specific transmission requirement and the service specific transmission requirement.

In accordance with the first variant of the second aspect, in which the multicast channel may be a Multicast Channel (MCH), the scheduling information may be MCH scheduling information (MSI), and the multicast service may conform to a Multimedia Broadcast Multicast Service (MBMS) specification, the data of each MBMS service may be carried on a respective MBMS Traffic Channel (MTCH) and the one or more MTCHs may be multiplexed into the MCH.

If one or more MTCHs are multiplexed with the MSI on one Transport Block (TB), the MSI and the one or more MTCHs multiplexed with the MSI on the TB may be decoded based on the MSI specific transmission requirement or the MSI and the one or more MTCHs multiplexed with the MSI on the TB may be decoded based on the more robust transmission requirement of the MSI specific transmission requirement and the service specific transmission requirement of the one or more MTCHs multiplexed with the MSI on the TB. Independent from the decoding of the MSI and the affected MTCH(s), the remaining MTCH(s) of the MCH may be decoded based on the service specific transmission requirement.

According to a second variant of the second aspect, which may/may not be combined with the first variant of the second aspect, the scheduling information specific transmission requirement may comprise a parameter specifying a number of retransmissions of the scheduling information. Alternatively or additionally, the scheduling information specific transmission requirement may comprise a Modulation and Coding Scheme (MCS) for the scheduling information. Similarly, the service specific transmission requirement may comprise a parameter specifying a number of retransmissions of the data belonging to the one or more multicast services. Alternatively or additionally, the service specific transmission requirement may comprise an MCS for the data belonging to the one or more multicast services.

According to a further aspect, a computer program product is proposed, comprising program code portions for performing the steps of any one of the method aspects described herein, when the computer program product is run on one or more computing devices. The computer program product may be stored on a computer readable recording medium.

According to a still further aspect, a network node for configuring transmission of a multicast channel carrying scheduling information and data belonging to one or more multicast services is proposed. The scheduling information indicates scheduling of the multicast services mapped to the multicast channel. The network node comprises a component for configuring the transmission of the scheduling information on the multicast channel based on a scheduling information specific transmission requirement and for configuring the transmission of the data belonging to the one or more multicast services based on a service specific transmission requirement; and a component for signaling the scheduling information specific transmission requirement and the service specific transmission requirement.

The network node may be an eNodeB (eNB) or a Multi-cell/Multicast Coordination Entity (MCE) according to the Long Term Evolution (LTE) standard.

According to still another aspect, a terminal device for decoding a multicast channel carrying scheduling information and data belonging to one or more multicast services is proposed. The scheduling information indicates scheduling of the multicast services mapped to the multicast channel. The terminal device comprises a component for determining a scheduling information specific transmission requirement and a service specific transmission requirement; and a component for decoding the scheduling information based on the scheduling information specific transmission requirement and for decoding the data belonging to the one or more multicast services based on the service specific transmission requirement.

The mobile terminal may be a Multimedia Broadcast Multicast Service (MBMS) capable User Equipment (UE) or an MBMS capable LTE UE.

BRIEF DESCRIPTION OF THE DRAWINGS

In the following, the invention will further be described with reference to exemplary embodiments illustrated in the figures, in which.

DETAILED DESCRIPTION

In the following description, for purposes of explanation and not limitation, specific details are set forth, such as specific network topologies including particular network nodes, in order to provide a thorough understanding of the present invention. It will be apparent to one skilled in the art that the present invention may be practiced in other embodiments that depart from these specific details. For example, the skilled artisan will appreciate that the present invention may be practiced with multicast/broadcast mechanisms different from the 3GPP MBMS standard discussed below to illustrate the present invention. Also, the invention may be practiced in any network to which mobile or stationary users may attach. For example, the invention is applicable to, besides cellular networks, WLAN, Bluetooth, DVB or similar wireless networks, but also to wireline networks such as, for example, the intranet of a company with some or many separated subsidiaries or the Internet.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present invention is described as a method, it may also be embodied in a computer processor and a memory coupled to a processor, wherein the memory is encoded with one or more programs to perform the methods disclosed herein when executed by the processor.

While the exemplary embodiments described below are based on a multicast service and multicast transmissions, the skilled person will understand that other Point To Multipoint (PTM) transmission techniques might also be used, for example a PTM technique based on broadcast transmission.

Figure 1:
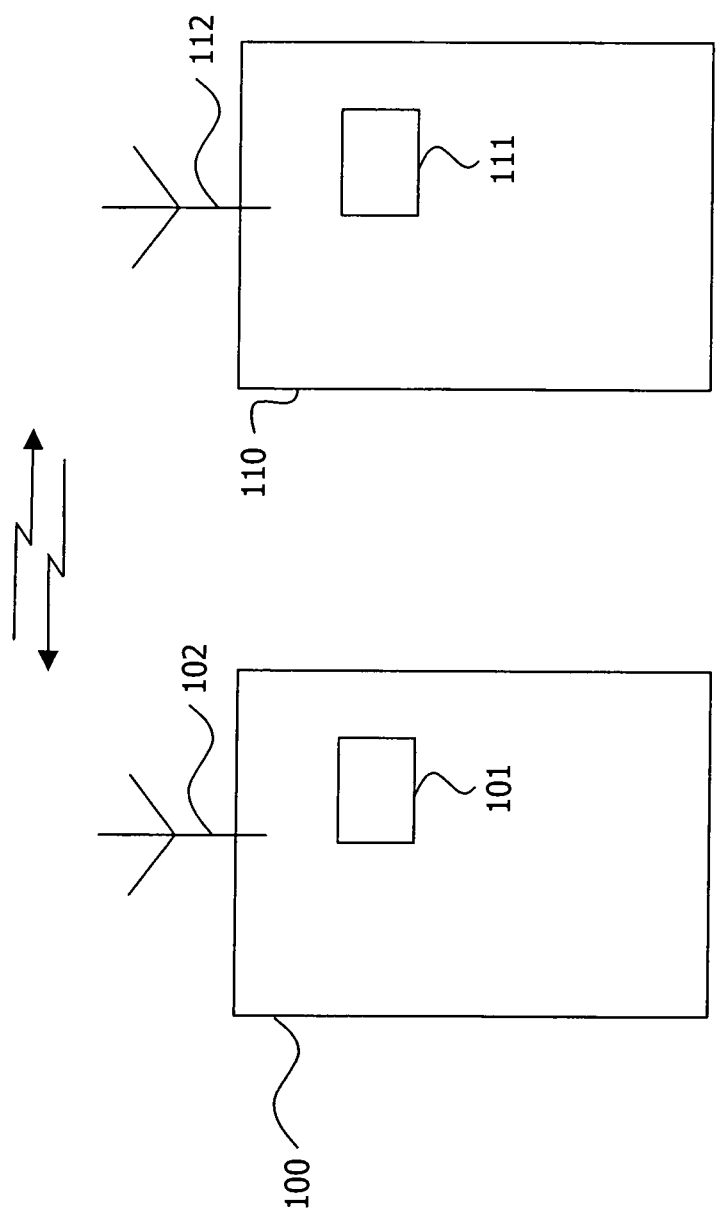
FIG. 1 is a schematic illustration of a network node and a terminal device according to the present invention.

With reference to FIG. 1, a network node 100 and a terminal device 110 are illustrated. The network node 100 may exemplarily comprise an eNodeB (eNB) or a Multicell/Multicast Coordination Entity (MCE) in an MBMS providing network providing MBMS services, and the terminal device (user equipment) 100 may exemplarily comprise a User Equipment (UE) capable of accessing Multimedia Broadcast Multicast Service (MBMS) services. As schematically illustrated in FIG. 1, the network node 100 comprises a unit 101 and the user equipment 110 comprises a unit 111. The unit 101 of the network node 100 is adapted to perform the first and second method embodiments (algorithms) illustrated in FIGS. 4 and 5. The unit 111 of the user equipment 110 is adapted to perform the third and fourth method embodiments (algorithms) illustrated in FIGS. 6 and 7. The network node 100 comprises an antenna 102 for communicating with the user equipment 110. Likewise, the user equipment 110 comprises an antenna 112 for communicating with the network node 100.

Figure 2:
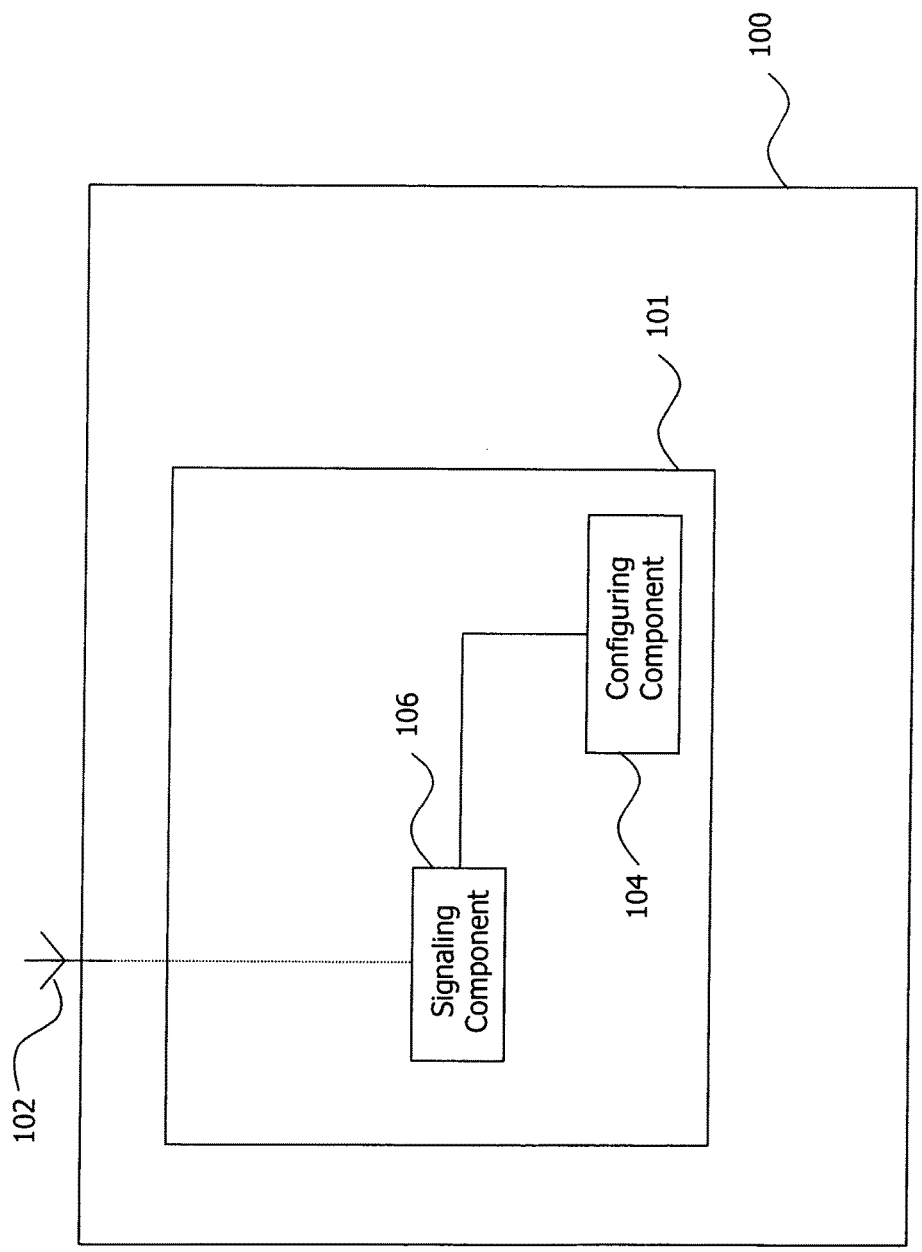
FIG. 2 is a schematic illustration of the network node shown in FIG. 1.

In FIG. 2, the network node 100 of FIG. 1 is (still schematically) illustrated in more detail. As shown in FIG. 2, the unit 101 for performing the first and second method embodiments illustrated in FIGS. 4 and 5, respectively, comprises a configuring component 104 and a signaling component 106 which are connected to each other. The operation of the configuring component 104 and the signaling component 106 will be described with respect to FIGS. 4 and 5 below.

Figure 3:
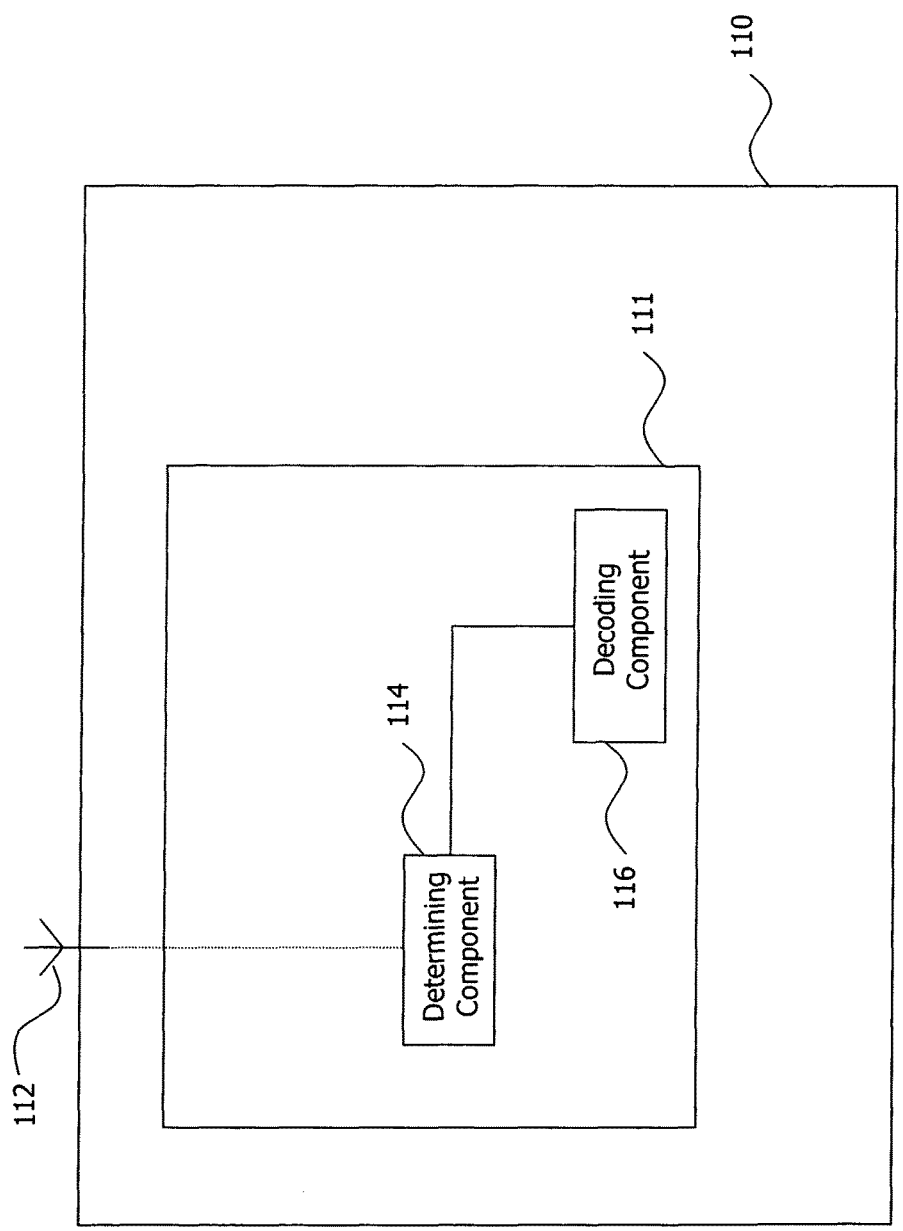
FIG. 3 is a schematic illustration of the terminal device shown in FIG. 1.

The user equipment 110 of FIG. 1 is (still schematically) illustrated in more detail in FIG. 3. As shown in FIG. 3, the unit 111 for performing the third and fourth method embodiments illustrated in FIGS. 6 and 7, respectively, comprises a determining component 114 and a decoding component 116 which are connected to each other. The operation of the determining component 114 and the decoding component 116 will be described with respect to FIGS. 6 and 7 below.

Figure 4:
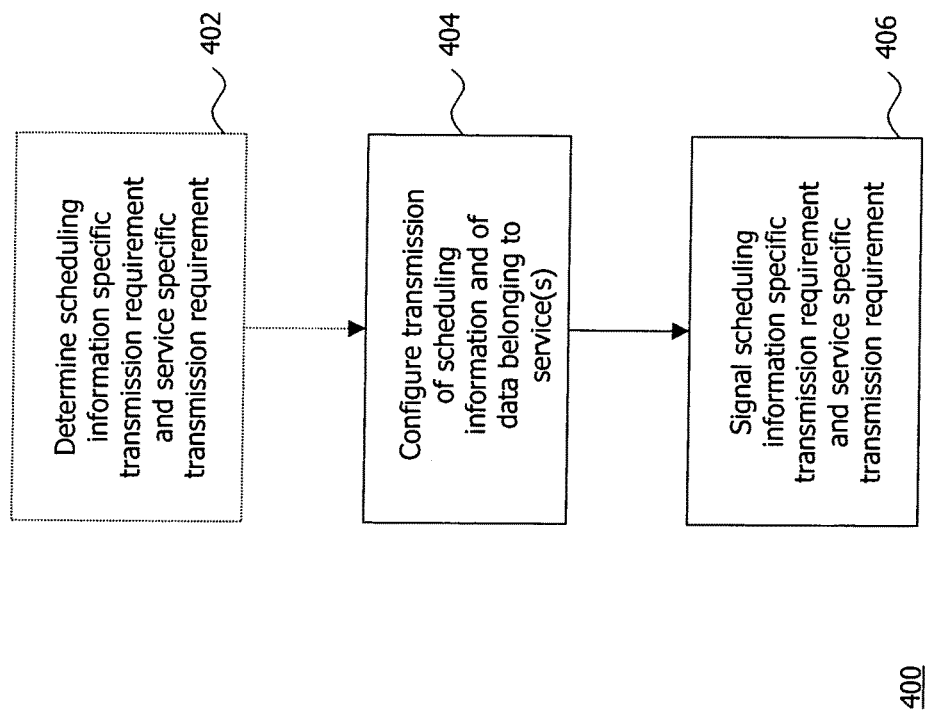
FIG. 4 is a flowchart illustrating a first method embodiment performed in the network node of FIGS. 1 and 2.

With respect to FIG. 4, a first method embodiment implemented in the network node 100, in particular the unit 101 of the network node 100, is described. The first method embodiment necessarily comprises steps 404 and 406. In addition to steps 404 and 406, the additional step 402 may be provided.

In step 402, a scheduling information specific transmission requirement and a service specific transmission requirement may be determined. For this purpose, a scheduling information specific Quality of Service (QoS) value and a service specific transmission QoS value may be determined in the configuring component 104 or a determining component (not shown) of the network node 100. In this respect, the scheduling information specific QoS value comprises information Indicating a scheduling information specific Block Error Rate (BLER), i.e. information indicating the BlER the Multicast Channel (MCH) Scheduling Information (MSI) requires. In accordance therewith, the service specific QoS value comprises information indicating a service specific Block Error Rate (BLER), i.e. information indicating the BLER data carried on one or more Multicast Traffic Channels (MTCHs) multiplexed into an MCH requires. In step 402, the scheduling information specific transmission requirement is determined on the basis of the scheduling information specific QoS value and the service specific transmission requirement is determined on the basis of the service specific QoS value.

The scheduling information specific transmission requirement may be determined such that an appropriate scheduling information specific Modulation and Coding Scheme (MCS) is selected dependent on the BLER required for the scheduling information and the service specific transmission requirement may be determined such that an appropriate service specific MCS is selected dependent on the BIER required for the respective service(s) mapped to the MCH.

In step 404, transmission of the MSI is configured by the configuring component 104 based on the scheduling information specific transmission requirement and transmission of the MTCH(s) is configured by the configuring component 104 based on the service specific transmission requirement. The scheduling information specific transmission requirement and the service specific transmission requirement may have been previously determined in step 402 or may otherwise have been determined by the configuring component 104.

As indicated above, an appropriate scheduling information specific MCS and an appropriate service specific MCS may be selected. Dependent on the selected scheduling information specific MCS, the scheduling information may be encoded and configured for transmission. Likewise, the data may be encoded and configured for transmission based on the service specific MCS.

In any way, the scheduling information specific transmission requirement and the service specific transmission requirement is provided by the configuring component 104 to the signaling component 106.

The signaling component 106 then signals, in step 406, the scheduling information specific transmission requirement and the service specific transmission requirement to the user equipment 110. The signaling component 106 is exemplarily adapted to signal the scheduling information specific transmission requirement and the service specific transmission requirement on a Multicast Control Channel (MCCH) to the user equipment 110 via the antenna 102. The signaling component 106 is further exemplarily adapted to signal the MSI and the MTCH(s) to the user equipment 110 via the antenna 102 on an MCH.

Figure 5:
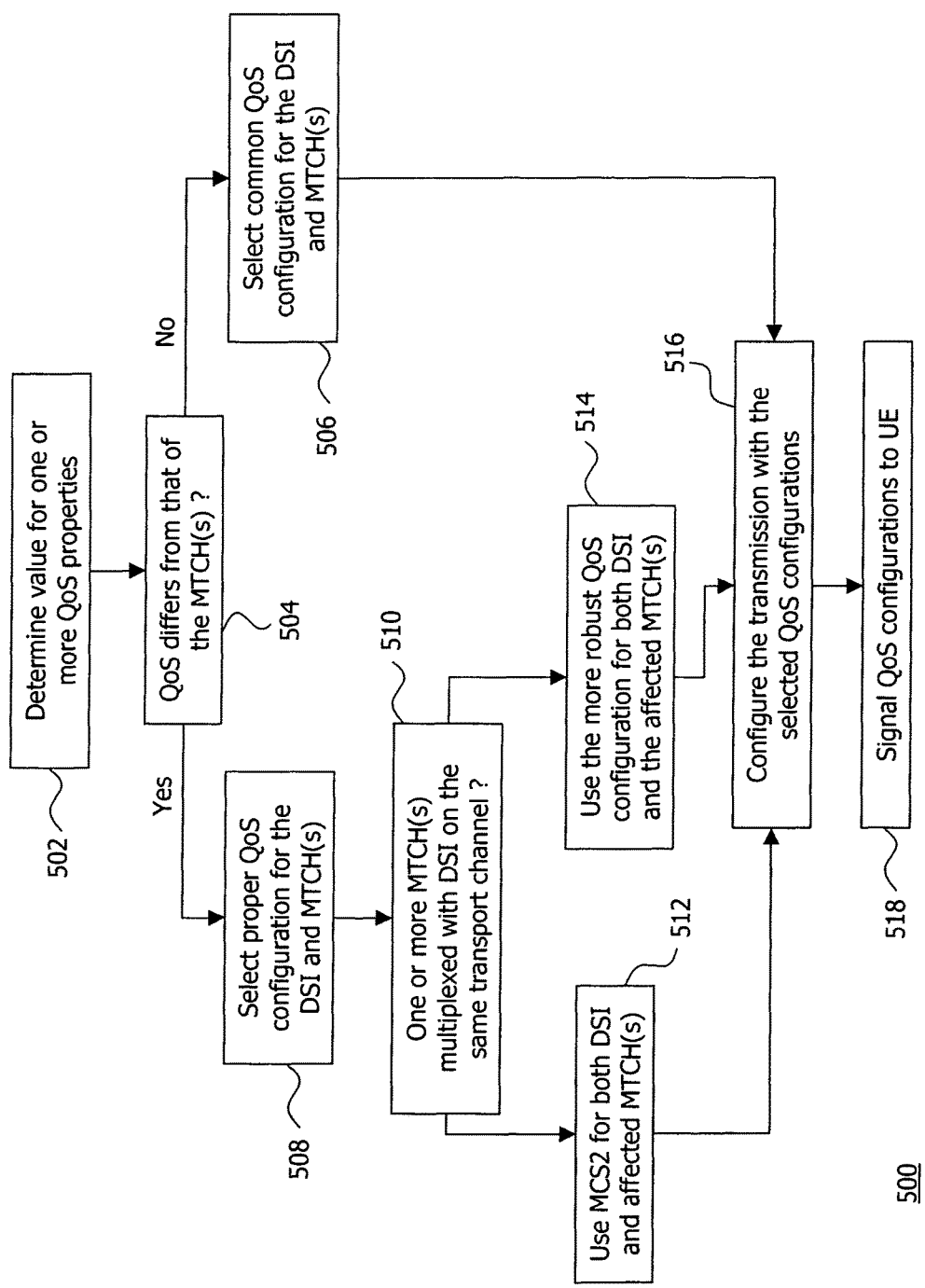
FIG. 5 is a flowchart illustrating a second method embodiment performed in the network node of FIGS. 1 and 2.

With respect to FIG. 5, a second method embodiment implemented in the network node 100 is described. The second method embodiment is a more detailed version of the first method embodiment. In step 502, a scheduling information specific QoS value related to one or more scheduling information specific QoS properties and a service specific QoS value related to one or more service specific QoS properties are determined. The service specific QoS properties exemplarily indicate a first Block Error Rate (BLER1) required for the one or more MTCH(s) mapped to the MCH and the scheduling information specific QoS properties exemplarily indicate a second Block Error Rate (BLER2) required for the MSI mapped to the MCH.

Then, it is determined in step 504, whether the scheduling information specific QoS value differs from the service specific QoS value. In the present exemplary, not limiting situation, the respective QoS values differ from each other because BLER1 and BLER2 are different from each other.

However, if it is assumed that the scheduling information specific QoS value is equal to the service specific QoS value, the algorithm continues in step 506, in which a common transmission requirement (exemplarily named common QoS configuration in FIG. 5) is selected for the MSI and the MTCH(s) mapped to the MCH. In case both QoS values indicate the same BLER1, a first Modulation and Coding Scheme (MCS1) selected as the common transmission requirement (in step 506) and MCS1 is applied to both the MSI and the MTCH(s) (in step 516). It is conceivable that not only the scheduling information, but also the data desires a relatively low BLER, e.g. in the case of live-critical messaging applications, i.e. the BLER of the scheduling information and the data may be the same in certain applications. Then, although a common transmission requirement, e.g. having a low BIER, is selected for both the scheduling information and the data, it is ensured that the scheduling information (and the data) can be decoded correctly.

If it is determined in step 504 that the scheduling information specific QoS value differs from the service specific QoS value, the algorithm continues in step 508. Step 508 is the starting point for separately selecting a proper transmission requirement (exemplarily named QoS configuration in FIG. 5) for the MSI and the MTCH(s). For this purpose, a potential Modulation and Cooling Scheme (MCS) is selected for both the MSI and the MTCH(s). In case the service specific QoS properties exemplarily indicate the BLER1 required for the one or more MTCH(s) mapped to the MCH and the scheduling information specific QoS properties exemplarily indicate the BLER2 required for the MSI mapped to the MCH, a first Modulation and Coding Scheme (MCS1) is selected as a potential MCS for the MTCH(s) and a second Modulation and Coding Scheme (MCS2) is selected as a potential MCS for the MSI.

In step 510 it is then determined whether one or more MTCHs are multiplexed with the MSI on the same Transport Block (TB) or transport channel. If one or more MTCHs are not multiplexed with the MSI on the same TB or transport channel, steps 512 and 514 are skipped. In this case, the transmission is configured in step 516 such that the MCS1 is applied to all MTCH(s) mapped to the MCH and MCS2 is applied to the MSI.

If one or more MTCHs are multiplexed with MSI on the same transport channel or TB, the MCH contains two subsets of data, namely a first subset of data which is multiplexed with the MSI on one TB and a second subset of remaining data which is not multiplexed with the MSI on the TB. There are two options of how to continue further, which are respectively illustrated as steps 512 and 514. According to the first option in step 512, the same MCS, namely MCS2, is used for both the MSI and the affected MTCHs (multiplexed with the MSI on the same TB). For the remaining MTCHs (not multiplexed with the MSI on the TB), a different MCS, namely MCS1 is applied. According to the second option in step 514, the more robust transmission requirement of the MSI specific transmission requirement (MCS2) and the service specific transmission requirement (MCS1) is used for configuring the transmission of both the MSI and the affected MTCHs. If MCS2 is more robust than MCS1, the result of the transmission requirement of step 514 is equal to the one of step 512, i.e. MCS2 is used for configuring both the DSI and affected MTCH(s). If, however, MCS1 is more robust than MCS2, MCS1 is used for configuring both the MSI and the affected MTCH(s). In any way, independent of whether the requirement of step 512 or step 514 is used, MCS1 is applied to the remaining (not affected) MTCHs.

The first option may be less complex, because the MSI specific transmission requirement and the service specific transmission requirement for the first subset of data do not have to be compared with each other. According to the first option, it may be assumed that the MSI specific transmission requirement is more robust, e.g. requires a lower BLER. If the MSI specific transmission requirement is selected as the single transmission requirement, it is at least ensured that the MSI can be decoded correctly.

In the second option, complexity may be slightly increased because of the comparing operation and it is ensured that the more robust transmission requirement is selected as the single transmission requirement, e.g. the one requiring the lower BLER, for configuring the transmission of the MSI and the first subset of data. If the more robust transmission requirement of the MSI specific transmission requirement and the service specific transmission requirement of the one or more MTCHs multiplexed with the MSI on the TB is selected, it is ensured that both the MSI and the MTCH(s) multiplexed with the MSI on the TB can be decoded correctly.

In step 516, the transmission is then configured with the selected transmission requirements and in step 518 the transmission requirements are signaled to the user equipment 110. For example, the selected MCSs are signaled on the MCCH from the network node 100 to the user equipment 110. If the same transmission requirement is appropriate for the MSI of all MCHs of the MBMS, the service specific transmission requirement is signaled in a single message that applies to all MSIs.

The second method embodiment of FIG. 5 may further comprise the following two steps which are not illustrated in FIG. 5. As a first step, the radio resources used for the MSI can further be signaled to the user equipment 110. Alternatively, the radio resources for the MSI can be determined at a fixed position among the radio resources of the corresponding MCH. As a second step, the network node 100, e.g. the signaling component 106, is adapted to perform the transmission of the MSI and the MTCH(s) on the MCH (to the user equipment 110) using the selected transmission requirements, e.g. the MCSs respectively selected for the MSI and the MTCH(s).

Figure 6:
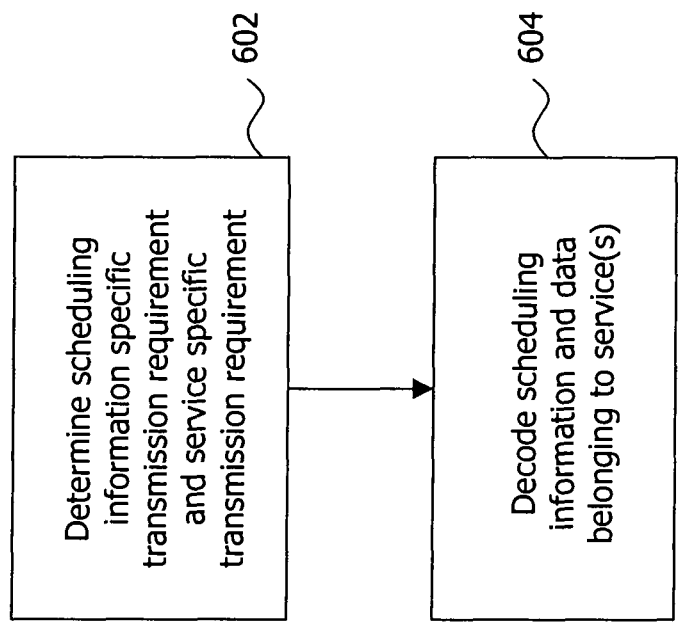
FIG. 6 is a flowchart illustrating a third method embodiment performed in the terminal device of FIGS. 1 and 3.

With respect to FIG. 6, a third method embodiment implemented in the user equipment 110, in particular the unit 111 of the user equipment 100, is described. The third method embodiment comprises steps 602 and 604.

In step 602, a scheduling information specific transmission requirement and a service specific transmission requirement is determined. As described with respect to FIGS. 4 and 5, the network node 100 signals the scheduling information specific transmission requirement and the service specific transmission requirement on the MCCH to the user equipment 110. The user equipment receives the MCCH and the determining component 114 determines therefrom the signaled scheduling information specific transmission requirement and the signaled service specific transmission requirement (in step 602).

The scheduling information specific transmission requirement may comprise a parameter specifying a number of retransmissions of the scheduling information. Alternatively or additionally, the scheduling information specific transmission requirement may comprise a Modulation and Coding Scheme (MCS) for the scheduling information. Similarly, the service specific transmission requirement may comprise a parameter specifying a number of retransmissions of the data belonging to the one or more multicast services. Alternatively or additionally, the service specific transmission requirement may comprise an MCS for the data belonging to the one or more multicast services.

For example, the service specific transmission requirement comprises a first Modulation and Coding Scheme (MCS1) for the data belonging to the one or more multicast services and the scheduling information specific transmission requirement comprises a second Modulation and Coding Scheme (MCS2) for the scheduling information. The MCS1 may be configured such that a first Block Error Rate (BLER1) is achieved for the data and the MCS2 may be configured such that a second Block Error Rate (BLER2) is achieved for the scheduling information, wherein the BLER2 may be less than or equal to (or lower than) the BLER1.

In step 604, the decoding component 116 then decodes the MSI based on the determined (signaled) scheduling information specific transmission requirement. Likewise, the decoding component 116 decodes, in step 604, the MTCH(s) based on the determined (signaled) service specific transmission requirement. If the service specific transmission requirement comprises MCS1 for the data belonging to the one or more multicast services and the scheduling information specific transmission requirement comprises MCS2 for the scheduling information, the data may be decoded using the MCS1 and the scheduling information may be decoded using the MCS2.

If the scheduling information is decoded correctly by a terminal device, the terminal device exactly knows when to wake up, i.e. exactly knows in which scheduling interval(s) the intended service, the terminal device or a user of the terminal device is interested in, is transmitted.

Figure 7:
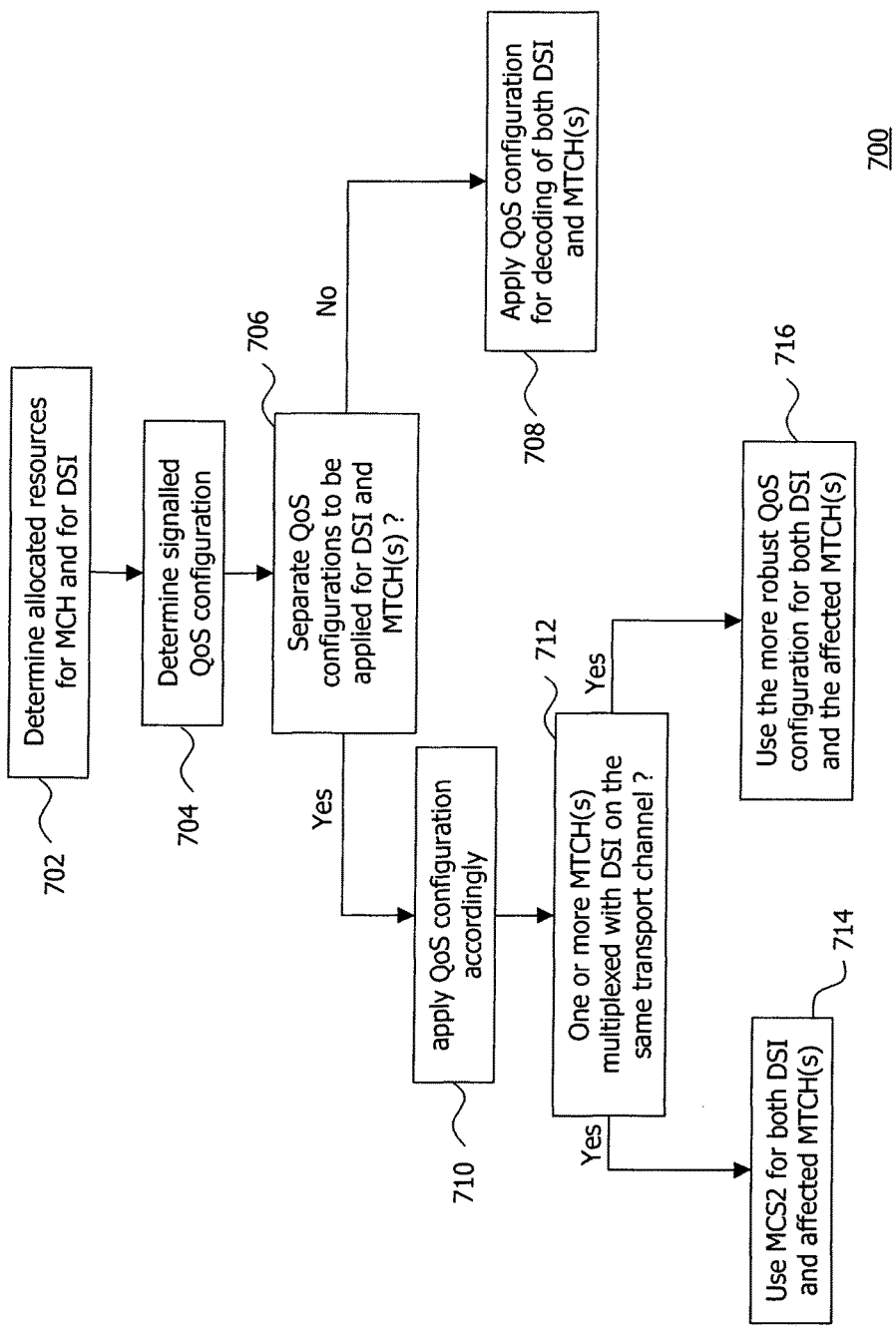
FIG. 7 is a flowchart illustrating a fourth method embodiment performed in the terminal device of FIGS. 1 and 3.

In FIG. 7, a fourth method embodiment performed by the terminal device 110 is illustrated. The fourth method embodiment is a more detailed version of the third method embodiment. In step 702, the resources allocated for a given MCH are determined from an MCCH signaled from the network node 100 to the user equipment 110. Further, it is determined whether radio resources allocated for the MSI are present in the MCCH. If radio resources allocated for the MSI are present in the MCCH, the respective radio resources are determined. Otherwise, preconfigured or standardized radio resources are assumed for the MSI in step 702.

In step 704, the signaled scheduling information specific transmission requirement and the signaled service specific transmission requirement (exemplarily named QoS configuration in FIG. 7) are determined from the MCCH. With reference to the exemplary description of FIG. 5, either MCS1 or MCS2 may be applied in different combinations to the MSI and one or more of the MTCH(s). In step 706, it is determined whether separate transmission requirements are to be applied for the MSI and one or more of the MTCH(s). If the same transmission requirements are to be applied to both the MSI and the MTCH(s), a common transmission requirement is applied for decoding both the MSI and all MTCH(s) of the MCH in step 708.

If separate transmission requirement are to be applied to the MSI and one or more MTCH(s), the transmission requirements are applied accordingly in step 710. For example, it may have been signaled from the network node 100 on the MCCH that MCS1 is to be applied to all MTCH(s) and MCS2 is to be applied to the MSI. Then, these requirements are respectively applied in step 710.

However, if it is determined in step 712 that one or more MTCH(s) are multiplexed with the MSI on the same TB or transport channel, the further steps 714 and 716 are performed. If not, the steps 714 and 716 are simply omitted and the requirements determined in step 710 are used for decoding.

If one or more MTCH(s) are multiplexed with the MSI on the same TB or transport channel, there are two options how to apply the respective transmission requirements to the MSI and the MTCH(s) multiplexed with the MSI on the same TB. In accordance with the first option of step 714, the same MCS, namely MCS2, is used for both MSI and the affected MTCH(s) (multiplexed with the MSI on the same TB). A different MCS, namely MCS1, is then applied to the remaining MTCH(s) (not multiplexed with the MSI on the same TB). Alternatively, in step 716, the more robust transmission requirement of the MSI specific transmission requirement and the service specific transmission requirement is applied to both the MSI and the affected MTCH(s). If MCS2 is more robust than MCS1, the result of step 716 is equivalent to the result of step 714, i.e. MCS2 is used for decoding the MSI and the affected MTCH(s). If, however, MCS1 is more robust than MCS2, MCS1 is used for decoding both the MSI and the affected MTCH(s). Independent of which MCS (MCS1 or MCS2) is more robust, MCS1 is applied to the remaining (not affected) MTCH(s) in step 716.

In this way, an improved and more efficient technique for MBMS service transmission is provided.

It is believed that many advantages of the present invention will be fully understood from the foregoing description and it will be apparent that various changes may be made in the form, construction and arrangement of the exemplary aspects thereof without departing from the scope of the present invention or without sacrificing all of its advantages. For example, the variants and aspects described with respect to the first method embodiment equally apply to the second method embodiment. Likewise, the variants and aspects described with respect to the third method embodiment equally apply to the fourth method embodiment. Because the present invention can be varied in many ways, it will be recognized that the invention should be limited only by the scope of the following claims.

The invention claimed is:

1. A network node comprising:
a processor configured to:
send a first transmission to one or more user equipment (UE), the first transmission comprising an indication that a first modulation and coding scheme (MCS) is to be used for a multicast channel (MCH) scheduling information (MSI) transmission;
send a second transmission, the second transmission comprising an indication that a second MCS is to be used for a multicast traffic channel (MTCH) transmission;
send the MSI transmission in a first subframe, the MSI transmission being modulated by the first MCS, wherein the MSI transmission comprises scheduling information for the MTCH transmission; and
send the MTCH transmission in a second subframe, the MTCH transmission being modulated by the second MCS.

2. The network node of claim 1, wherein the first transmission is sent via a broadcast control channel (BCCH).

3. The network node of claim 1, wherein the second transmission is sent via a multicast control channel (MCCH).

4. The network node of claim 1, wherein the first subframe in which the MSI transmission is sent corresponds to a subframe associated with an MCH subframe allocation.

5. A method implemented by a user equipment (UE), the method comprising:
receiving a first transmission from a network node, the first transmission comprising an indication that a first modulation and coding scheme (MCS) is to be used for a multicast channel (MCH) scheduling information (MSI) transmission;
receiving a second transmission, the second transmission comprising an indication that a second MCS is to be used for a multicast traffic channel (MTCH) transmission;
receiving the MSI transmission in a first subframe, the MSI transmission being modulated by the first MCS, wherein the MSI transmission comprises scheduling information for the MTCH transmission; and
receiving the MTCH transmission in a second subframe, the MTCH transmission being modulated by the second MCS.

6. The method of claim 5, wherein the first transmission is received via a broadcast control channel (BCCH).

7. The method of claim 5, wherein the second transmission is received via a multicast control channel (MCCH).

8. The method of claim 5, wherein the first subframe in which the MSI transmission is received corresponds to a subframe associated with an MCH subframe allocation.

9. A user equipment (UE) comprising:
a processor configured to:
receive a first transmission from a network node, the first transmission comprising an indication that a first modulation and coding scheme (MCS) is to be used for a multicast channel (MCH) scheduling information (MSI) transmission;
receive a second transmission, the second transmission comprising an indication that a second MCS is to be used for a multicast traffic channel (MTCH) transmission;
receive the MSI transmission in a first subframe, the MSI transmission being modulated by the first MCS, wherein the MSI transmission comprises scheduling information for the MTCH transmission; and
receive the MTCH transmission in a second subframe, the MTCH transmission being modulated by the second MCS.

10. The UE of claim 9, wherein the first transmission is received via a broadcast control channel (BCCH).

11. The UE of claim 9, wherein the second transmission is received via a multicast control channel (MCCH).

12. The UE of claim 9, wherein the first subframe in which the MSI transmission is received corresponds to a subframe associated with an MCH subframe allocation.

* * * * *